United States Patent [19]
Wolf et al.

[11] Patent Number: 5,818,447
[45] Date of Patent: Oct. 6, 1998

[54] SYSTEM AND METHOD FOR IN-PLACE EDITING OF AN ELECTRONIC MAIL MESSAGE USING A SEPARATE PROGRAM

[75] Inventors: Richard J. Wolf, Seattle; Srinivasa R. Koppolu; Suryanarayanan Raman, both of Redmond; Steven J. Rayson, Seattle, all of Wash.

[73] Assignee: Microsoft Corporation, Redmond, Wash.

[21] Appl. No.: 660,019

[22] Filed: Jun. 6, 1996

[51] Int. Cl.⁶ ....................................................... G06T 1/00
[52] U.S. Cl. .................... 345/335; 395/683; 395/200.36; 707/516; 707/524
[58] Field of Search ...................................... 395/682, 683, 395/200.33, 285, 200.6, 200.61; 345/335, 352; 707/516, 524, 530

[56] References Cited

U.S. PATENT DOCUMENTS

| 5,682,532 | 10/1997 | Remington et al. ..................... 395/683 |
| 5,682,536 | 10/1997 | Atkinson et al. .................... 395/683 X |
| 5,706,458 | 1/1998 | Koppolu . |

OTHER PUBLICATIONS

Oski, "Mac clients, take note: Lotus Notes 4.1 finally arrives", MacWEEK, v10, n21, pp. 23(2), May 1996.

Goulde, "Microsoft adapts to the WWW", Distributed Computing Monitor, v11 n2, pp. 21(5), Feb. 1996.

Jones, "Microsoft readies DocObject; technology will allow document editing in Web browsers", InfoWorld, v18 n18, p. 49, Apr. 1996.

Varhol, "Microsoft Activex will complement, not conquer, Java", Government Computer News, v15 n10, pp. 27 (2), May 1996.

Drews, "MIME interoperability: sharing files via E–mail", Network Computing, v7 n6, pp. 96 (2), Apr. 1996.

"OLE 2 Programmer's Reference", Microsoft Press, 1994, vol. 1, pp. 3–29.

"User's Guide: Lotus cc:MAIL, Release 2", Lotus Development Corporation, 1993, pp. 217–236.

"User's Guide: Lotus Ami Pro, Release 3.0", Lotus Development Corporation, 1993, pp. 429–441.

*Primary Examiner*—Joseph H. Feild
*Attorney, Agent, or Firm*—Jones & Askew

[57] ABSTRACT

An email client invokes a DocObject-enabled mail note to display an email message and related features of the user interface. The mail note, which is a DocObject container, creates a DocObject server by invoking a DocObject-enabled word processor. The mail note provides a view port in which the word processor displays and edits the body of the email message. The word processor provides its formatting and editing features in the context of the mail note. OLE menu merging provides both email and word processing interoperability while editing the message. Programming interfaces between the mail note and the word processor allow the mail note to translate message data back and forth between the word processor's format and the format imposed by the email client. This ensures that messages created with the word processor can be read by other email clients.

40 Claims, 9 Drawing Sheets

SYSTEM AND METHOD FOR IN-PLACE EDITING OF AN ELECTRONIC MAIL MESSAGE USING A SEPARATE PROGRAM

TECHNICAL FIELD

The present invention relates to a system and method for handling electronic mail (email), and more particularly relates to a system and method for utilizing a separate program to edit and display an email message in the context of an email client.

BACKGROUND OF THE INVENTION

In the past there has been a tremendous difference between the formatting options available for electronic mail (email) and those available for printed documents. Email messages were generally restricted to the transmission of simple text and relied on formatting conventions that traced their history back to teletypes. For example, emoticons such as :-), abbreviations such as <G>, and suggested formatting such as _underline_ and *bold* were the only way to express emotion or to draw emphasis within simple text messages.

While email's formatting options have remained fairly basic, the formatting options and editing features provided by full power word processors have dramatically increased. With a full powered word processor, tho user is able to apply a wide variety of styles and formatting options. In addition to the richer formatting, full powered word processors provide powerful editing features, such as background spell checking and automatic correction of common typographical errors. Full powered word processors also allow users to create increasingly sophisticated and complex documents that include drawing objects, text colored with a highlighter, borders, shading, tables, and special bullets.

As the popularity of email has increased, three changes have taken place. First, some software publishers have added some rich text capabilities to the email program. Although this approach allowed a user to change the formatting used in an email message, it required users to edit email messages in an environment that was different than the word processor they were accustomed to. In addition, the rich text email programs simply do not possess the broad array of features common to sophisticated word processors.

A second approach has been to add some email capabilities to word processing programs. Although this simplified the process of sending a message that was created by the word processor, it presented several drawbacks. First, the recipient of the message needed to have a compatible word processor in order to read the message. Second, the editing environment is disconnected from the email environment. Third, this approach does not make it easier to read incoming email from various sources. Fourth, this approach does not facilitate sending file attachments to plain text or basic rich text (downlevel) email clients.

Finally, a third approach has been one in which users have decided to use a full power word processor for authoring sophisticated and complex documents, and then use email for distribution. This requires the user to work in the word processing context to create and edit the document. When the document is complete, the user must switch to the email program, create a new message, and include the word processor document as an attachment. Although email is an effective mechanism for transporting documents, handling attachments requires several additional steps on the part of both the sender and the recipient of the message.

Therefore, there is a need in the art for an efficient, intuitive system that allows users to create sophisticated documents for transmission via electronic mail. Such a system should provide sophisticated formatting and editing options in the context of the email environment and should provide message data in a format that is compatible with downlevel email clients.

SUMMARY OF THE INVENTION

The present invention satisfies the above-described needs by employing a container object and a server object to display an email message. The container object provides a view port in which the server object renders the body of the email message. This allows all of the formatting and editing features of the server object to be applied to the body of the email message. The container object provides controls associated with both an email program (the email client) and the server object, and serves as the interface between the server object and the email client. The container object translates the message data between the format used to store the data in the message store and the format used by the server object. The container object ensures that formatting and attachments rendered by the server object are properly translated so that the resulting email message is compatible with other email clients.

For example, the present invention allows a user to edit or view an email message item from an email client program. The email client invokes a mail note (the container object), which provides an email-related user interface. The container object also provides a view port or frame for viewing and editing the contents of an email message. Instead of implementing text editing or word processing functionality in the mail note or email client, the mail note allows a separate, full-featured word processor program (the server object) to display and edit the message in the view port provided by the mail note. This allows the user to edit and view email messages using the editing environment and formatting capabilities of the full-featured word processing program. The mail note provides the interface between the word processor and the data structure (or message store) in which the message data is stored. This data structure must be compatible with the email client, which is responsible for sending and receiving message items.

In one aspect, the present invention provides a method for operating a container object to display a message item, which is stored in a message store. The container object is invoked by an email application program (the email client) in response to input from a user. The container object retrieves header data and body data from the message store, and creates a server object associated with a program module, such as a word processor. The program module is operative for rendering the body data. The container object provides the body data to the program module and displays a mail note that includes a command region, a header region and a body region. The command region includes commands associated with both the container object and the program module. The header region includes at least a portion of the header data. The body region includes at least a portion of the body data as rendered by the program module.

In another aspect, the container object retrieves from the message store attachment data associated with the message item. The attachment data is provided to the program module and is displayed in the body region. The attachment data is displayed by the program module in association with the body data.

In another aspect, the present invention provides a method for operating a container object to edit a message item. The container object is invoked by an email client application in response to input from a user. The container object creates a server object associated with a program module and displays a mail note that includes a command region, a header region and a body region. The command region includes commands associated with both the container object and the program module and the body region includes body data rendered by the program module. The container object extracts the body data from the program module and forms a message item that includes a header and a body, which includes body data. The message item is then transmitted to the intended recipient.

More particularly described, the message includes an attachment list. The container object displays the attachment data in the body region, with the attachment data being rendered by the program module in association with the body data. The attachment data is extracted from the program module and stored in the attachment list portion of the message item. In some cases, formatting codes included in the body data are removed prior to storing the body data in the message item. Similarly, the program module may be provided with template identification data corresponding to formatting to be applied to the body data.

The various aspects of the present invention may be more clearly understood and appreciated from a review of the following detailed description of the disclosed embodiments and by reference to the appended drawings and claims.

DETAILED DESCRIPTION

Figure 1:
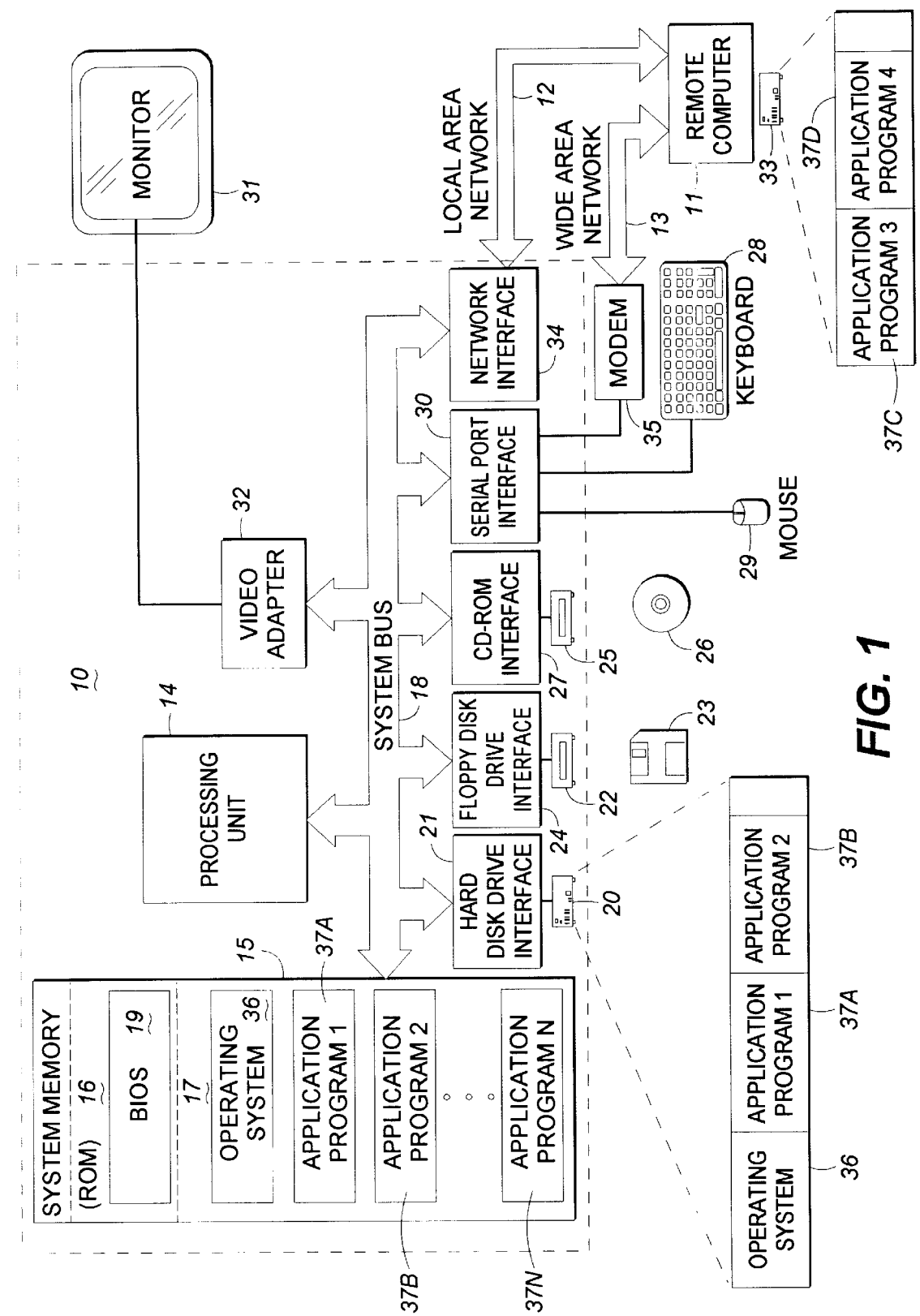
FIG. 1 is a block diagram of a computer system that provides the operating environment for an exemplary embodiment of the present invention.

The present invention is directed to an improved system and method for editing and viewing an email message. Generally described, an embodiment of the present invention employs a Document Object-enabled mail note or form to provide a Document Object container with an email-related user interface (UI) and a view port or frame for viewing and editing the contents of an email message. Instead of implementing text editing or word processing functionality in the mail note itself, the mail note allows a separate, full-featured word processing program to display and edit the email message in the view port provided by the mail note. The mail note then extracts the message data from the word processor and reformats the data to comply with the format required by the email client program. This allows the user to edit and view email messages using the editing environment and formatting capabilities of the full-featured word processing program, while also providing messages that are compatible with various types of email clients.

Those skilled in the art will appreciate that an exemplary embodiment of the present invention relies on and incorporates several common features of modem personal computers. In order to provide a sufficient background for an embodiment of the present invention, it is useful to first discuss a variety of topics, including an exemplary operating system, the Object Linking and Embedding (OLE) and Document Object (DocObject) interfaces, and the Messaging Application Programming Interface (MAPI). An exemplary embodiment of the present invention will be described after each of these components is briefly discussed.

Although exemplary embodiments of the present invention will be generally described in the context of an operating system and programs running on a personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description that follows is represented largely in terms of processes and symbolic representations of operations by conventional computer components, including a processing unit, memory storage devices for the processing unit, display devices, and input devices. Furthermore, these processes and operations may utilize conventional computer components in a heterogeneous distributed computing environment, including remote file servers, remote compute servers, and remote memory storage devices. Each of these conventional distributed computing components is accessible by the processing unit via a communications network.

The processes and operations performed by the computer include the manipulation of signals by a processing unit or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, data, objects, properties, tags, types, identifiers, values, elements, symbols, characters, terms, numbers, points, records, messages, images, files, documents, or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, receiving, sending, transmitting, replying, etc. which are often associated with manual operations performed by a human operator. The operations described herein are machine operations performed in conjunction with various input provided by a human operator or user that interacts with the computer.

In addition, it should be understood that the programs, processes, methods, etc. described herein are not related or limited to any particular computer or apparatus, nor are they related or limited to any particular communication network architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, aspects of the present invention and the an exemplary operating environment will be described.

The Operating Environment

FIGS. 1–7 illustrate various aspects of a computing environment in which the present invention is designed to operate. Those skilled in the art will immediately appreciate that FIGS. 1–7 and the associated discussion are intended to provide a brief, general description of various computer hardware, program modules, and interfaces, and that additional information is readily available in the appropriate programming manuals, user's guides, and similar publications.

The Computer Hardware

FIG. 1 illustrates a conventional personal computer 10 suitable for supporting the operation of an embodiment of the present invention. As shown in FIG. 1, the personal computer 10 operates in a networked environment with logical connections to a remote computer 11. The logical connections between the personal computer 10 and the remote computer 11 are represented by a local area network 12 and a wide area network 13. Those of ordinary skill in the art will recognize that in this client/server configuration, the remote computer 11 may function as a file server or compute server.

The personal computer 10 includes a processing unit 14, such as the 80486 or "PENTIUM" microprocessors manufactured by Intel Corporation of Santa Clara, Calif. The personal computer also includes system memory 15 (including read only memory (ROM) 16 and random access memory (RAM) 17), which is connected to the processing unit 14 by a system bus 18. The computer 10 utilizes a BIOS 19, which is stored in ROM 16. Those skilled in the art will recognize that the BIOS 19 is a set of basic routines that helps to transfer information between elements within the personal computer 10. Those skilled in the art will also appreciate that the present invention may be implemented on computers having other architectures, such as computers that do not use a BIOS, and those that utilize other microprocessors, such as the "MIPS" or "POWER PC" families of microprocessors from Silicon Graphics and Motorola, respectively.

Within the personal computer 10, a local hard disk drive 20 is connected to the system bus 18 via a hard disk drive interface 21. A floppy disk drive 22, which is used to read or write a floppy disk 23, is connected to the system bus 18 via a floppy disk drive interface 24. A CD-ROM drive 25, which is used to read a CD-ROM disk 26, is connected to the system bus 18 via a CD-ROM interface 27. A user enters commands and information into the personal computer 10 by using input devices, such as a keyboard 28 and/or pointing device, such as a mouse 29, which are connected to the system bus 18 via a serial port interface 30. Other types of pointing devices (not shown in FIG. 1) include track pads, track balls, pens, head trackers, data gloves and other devices suitable for positioning a cursor on a computer monitor 31. The monitor 31 or other kind of display device is connected to the system bus 18 via a video adapter 32.

The remote computer 11 in this networked environment is connected to a remote memory storage device 33. This remote memory storage device 33 is typically a large capacity device such as a hard disk drive, CD-ROM drive, magneto-optical drive or the like. The personal computer 10 is connected to the remote computer 11 by a network interface 34, which is used to communicate over the local area network 12.

As shown in FIG. 1, the personal computer 10 is also connected to the remote computer 11 by a modem 35, which is used to communicate over the wide area network 13, such as the Internet. The modem 35 is connected to the system bus 18 via the serial port interface 30. The modem 35 also can be connected to the public switched telephone network (PSTN) or community antenna television (CATV) network. Although illustrated in FIG. 1 as external to the personal computer 10, those of ordinary skill in the art will quickly recognize that the modem 35 may also be internal to the personal computer 11, thus communicating directly via the system bus 18. It is important to note that connection to the remote computer 11 via both the local area network 12 and the wide area network 13 is not required, but merely illustrates alternative methods of providing a communication path between the personal computer 10 and the remote computer 11.

Although other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that program modules such as an operating system 36, application programs 37, and data are provided to the personal computer 10 via computer-readable media. In the computer 10, the computer-readable media include the local or remote memory storage devices, which may include the local hard disk drive 20, floppy disk 23, CD-ROM 26, RAM 17, ROM 16, and the remote memory storage device 33. In the personal computer 10, the local hard disk drive 20 is used to store data and programs, including the operating system and programs. The application programs 37 may include word processing programs and email programs, such as those discussed in the context of an embodiment of the present invention.

The Operating System

Figure 2:
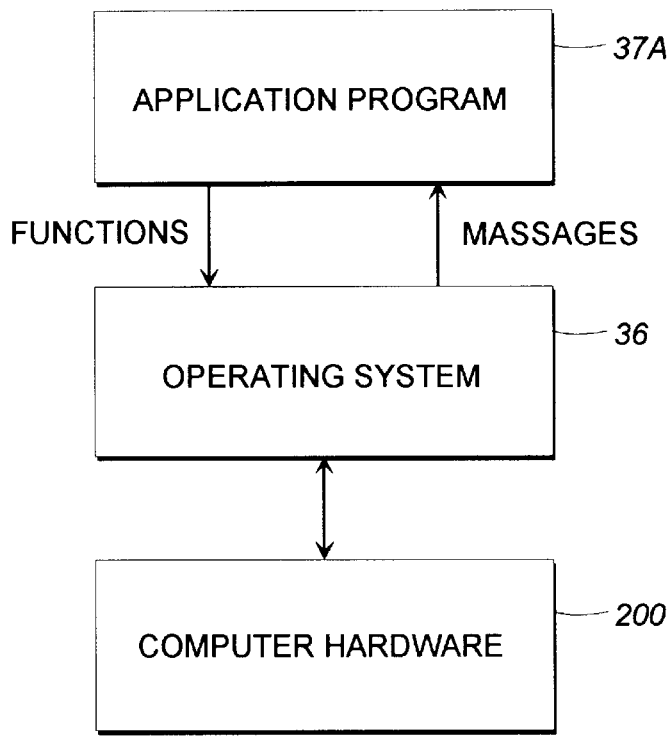
FIG. 2 is a block diagram illustrating the interface between a computer's input/output devices, an operating system, and an application program.

FIG. 2 is a simplified block diagram illustrating the interaction between the computer hardware 200, an exemplary operating system 36, and an application program 37a. Referring now to both FIGS. 1 and 2, when the personal computer 10 is turned on or reset, the Basic Input/Output System (BIOS) 19, which is stored in the ROM 16, instructs the processing unit 14 to load the operating system 36 from the hard disk drive 20 into the RAM 17. Once the operating system 36 is loaded into RAM 17, the processing unit 14 executes the operating system 36 and causes the visual elements associated with the user interface of the operating system 36 to be displayed on the monitor 31.

The operating system 36, in conjunction with the BIOS 19 (FIG. 1) and associated device drivers, provides the basic interface between the computer's resources, the user, and the application program 37a. The operating system 36 interprets and carries out instructions issued by the user. For example, when the user wants to load an application program 37a, such as a word processing program, the operating system 36 interprets the instruction (e.g., double clicking on the application program's icon) and causes the processing unit 14 to load the program code into RAM 17 from either the local hard disk drive 20, floppy disk 23, CD-ROM 26, or the remote memory storage device 33. Once the application program 37a is loaded into the RAM 17, it is executed by the processing unit 14. In case of large programs, the processing unit 14 loads various portions of program modules into RAM 17 as needed.

The preferred embodiment of the present invention is represented by the "MICROSOFT EXCHANGE" email client and the "MICROSOFT WORD" word processing program, which forms a part of the "MICROSOFT OFFICE" suite of program modules. The "MICROSOFT WORD" word processor and the "MICROSOFT EXCHANGE" email client are designed to operate in conjunction with Microsoft Corporation's "WINDOWS 95" or "WINDOWS NT" operating systems. However, it should be understood that the invention can readily be implemented by program modules for use with other operating systems, such as Microsoft Corporation's "WINDOWS 3.1" operating system, IBM Corporation's "OS/2" operating system, and the operating system used in "MACINTOSH" computers manufactured by Apple Computer, Inc.

The operating system 36 provides a variety of functions, services, and interfaces that allow an application program 37a to easily deal with various types of input/output (I/O). This allows the application program 37a to issue relatively simple function calls that cause the operating system 36 to perform the steps required to accomplish various tasks, such as displaying text on the monitor 31 (FIG. 1) or printing text on an attached printer (not shown). Generally described (with reference to FIG. 2), the application program 37a communicates with the operating system 36 by calling predefined functions provided by the operating system 36. The operating system 36 responds by providing the requested information in a message or by executing the requested task.

The OLE and DocObject Interfaces

The "WINDOWS 95" and "WINDOWS NT" operating systems support Microsoft Corporation's Object Linking and Embedding (OLE) and Document Object (DocObject) interfaces. Both OLE and DocObject support a variety of application programming interfaces (APIs) that simplify the interaction between program modules.

OLE is a technology that enables developers to create extensible application programs that operate across multiple platforms. OLE-enabled applications allow users to manipulate information in an intuitive manner, using an environment that is more "document-centric" and less "application-centric." Users can create compound documents with data, or objects, of different formats, and focus directly on the data rather than on the application programs responsible for the data. The data can be embedded within the document, or linked to it, so that only a reference to the data is stored in the document.

OLE facilitates application integration by defining a set of standard interfaces, which are groupings of semantically-related functions through which one program module accesses the services of another. OLE is an open system in the sense that any application program can provide an implementation of a defined interface and any application program can use it. Application programs can either take advantage of built-in functionality provided by OLE, or add to it or replace it as best suits their needs.

The set of OLE services can be viewed as a two tier hierarchy. The lower level contains infrastructure services. These are basic services that provide the means by which features can be implemented and used. The infrastructure services include interface negotiation, memory management, error and status reporting, interprocess communication, structured storage, and data transfer. The upper level of the OLE service hierarchy provides application features, which are the services that benefit the end user. These include compound document management, in-place activation, programmability, and drag and drop operations.

OLE's interfaces provide the standard for component object interaction. Each interface contains a set of functions that defines a contract between the object implementing the interface and the client using it. The contract includes the name of the interface, the function names, and the parameter names and types. Under this contract, the object must implement all of the functions defined for that interface and the implementations must conform to the contract.

All interface names are prefixed with either "I" or "IOle." Interfaces that begin with "IOle" provide services relating to compound document management. Those that begin with "I" provide services that are more general in nature. For example, IOleObject contains methods used by a client of an embedded or linked compound document object. IOleObject is implemented and used only by applications that participate in compound document management. IDataObject, however, contains methods that are used by all applications. These methods provide the means by which data of any type is transferred.

OLE supports the provision of a "compound document," which is a container object that contains a "linked" object or an "embedded" object. The difference between linked and embedded objects has to do with where the actual source data associated with the object is stored. This affects the object's portability, it method of activation and the size of the compound document.

When an object is linked, the source data continues to reside wherever it was initially created, which may be at another point in the document or in another, document altogether. Only a reference, or link, to the object is kept within the compound document. Linking is efficient and minimizes the size of the compound document. Changes made to the source are automatically reflected in any compound document that has a link to the source object. From the user's point of view, a linked object appears to be wholly contained within the document.

With an embedded object, a copy of the original object is physically stored in the compound document, along with all of the information needed to manage that object. As a result, the object becomes a physical part of the document. A compound document containing an embedded object will be larger than one containing the same objects as links. However, embedding offers advantages that offset the larger storage requirement. For example, compound objects with embedded objects can be transferred to another computer and edited there.

Embedded objects can be edited, or activated in place. This means that all maintenance of the object can be done without leaving the compound document. In order to edit the embedded object, the object must be explicitly activated or opened by performing an action such as double-clicking on the object's icon. This results in the object being displayed in a separate window with the user interface provided by the application program that created the object. The object is said to become in-place active (i.e., it is editable), and UI active (i.e., it displays the user interface associated with the application program that created the embedded object).

Figure 3:
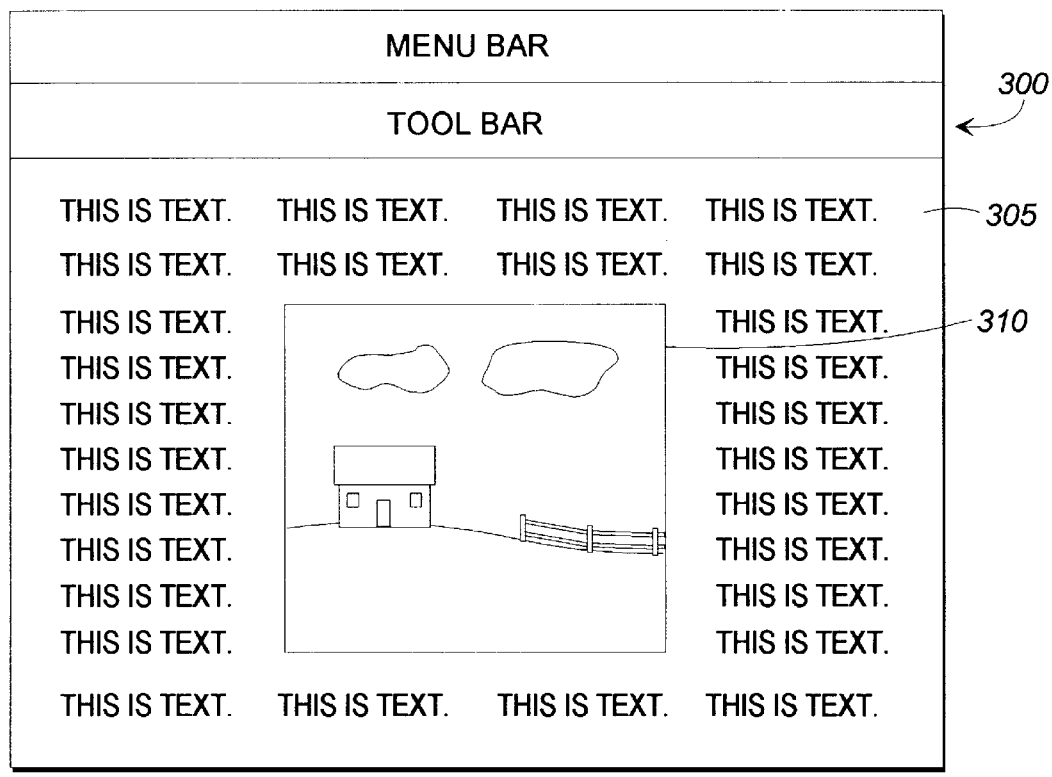
FIG. 3 illustrates a compound document in a word processing document frame.

OLE includes the concepts of native and foreign frames. A frame is a boundary that bounds or frames a view port, and may include menus, toolbars, status bars and the like. A native frame is a frame produced by the application program that created or is associated with the object whose view is being displayed inside the frame. An example of a native frame is a word processing frame in which a view of a word processing document is displayed. With a foreign frame, the frame is produced by an application program that is not associated with the object whose view is being displayed in the frame. An example of a foreign frame is a word processing document frame in which an embedded spreadsheet object is being displayed. FIG. 3 illustrates a word processing document frame 300. The frame 300 includes text 305 and an embedded graphics object 310.

In summary, OLE allows objects to be embedded in a compound document, which is displayed in a container or frame. Generally, the embedded document is displayed in the container in what is referred to as object view. The container controls the appearance of the page and the layout of headers, footers, end notes, etc. The embedded object has no control over these aspects of the page. The container also controls the amount of space that is allocated to the embedded object for displaying its pictorial representation.

Some of the limitations associated with displaying an embedded object in a compound document are addressed by Microsoft Corporation's Document Object, or DocObject, technology. DocObject is an OLE 2.0 interface built on top of OLE and facilitates displaying an object in a "document view" instead of an "object view." The DocObject interface logically partitions a "view" of a document object from a "frame" in which the document object is displayed. The frame specifies the location and dimensions of a view port to which the document object is to display a view. The document view controls the page model and the dimensions of what is displayed within the view port.

In the DocObject interface, a graphical representation of a document object includes a view frame component and a view component. The view frame component provides space for menus, toolbars, etc. The view frame component also provides a view port, which is also referred to as a frame, for the document view of the document object. The document view can display itself with rulers, scroll bars, etc.

Figure 4:
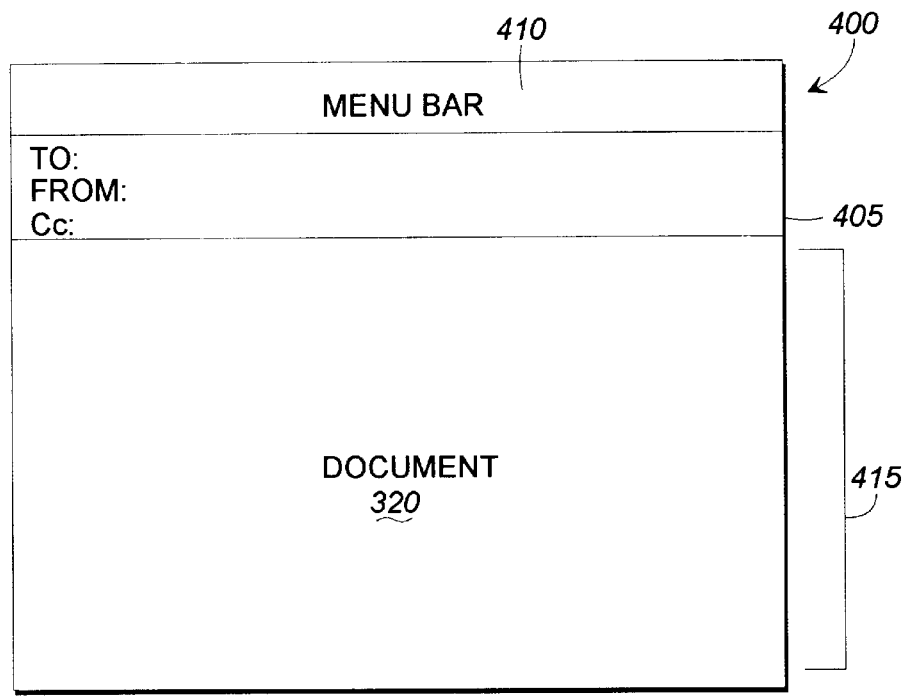
FIG. 4 illustrates a document object container embodied in an email note.

These DocObject components are illustrated in FIG. 4, which depicts a message view 400 for an email message. The document view 400 includes a view frame component 405, which includes a header 410 and a view port 415. The header 410 displays menus, toolbars, and other features of the user interface. The view port 415 is used to display a view of a document 420.

Figure 5A:
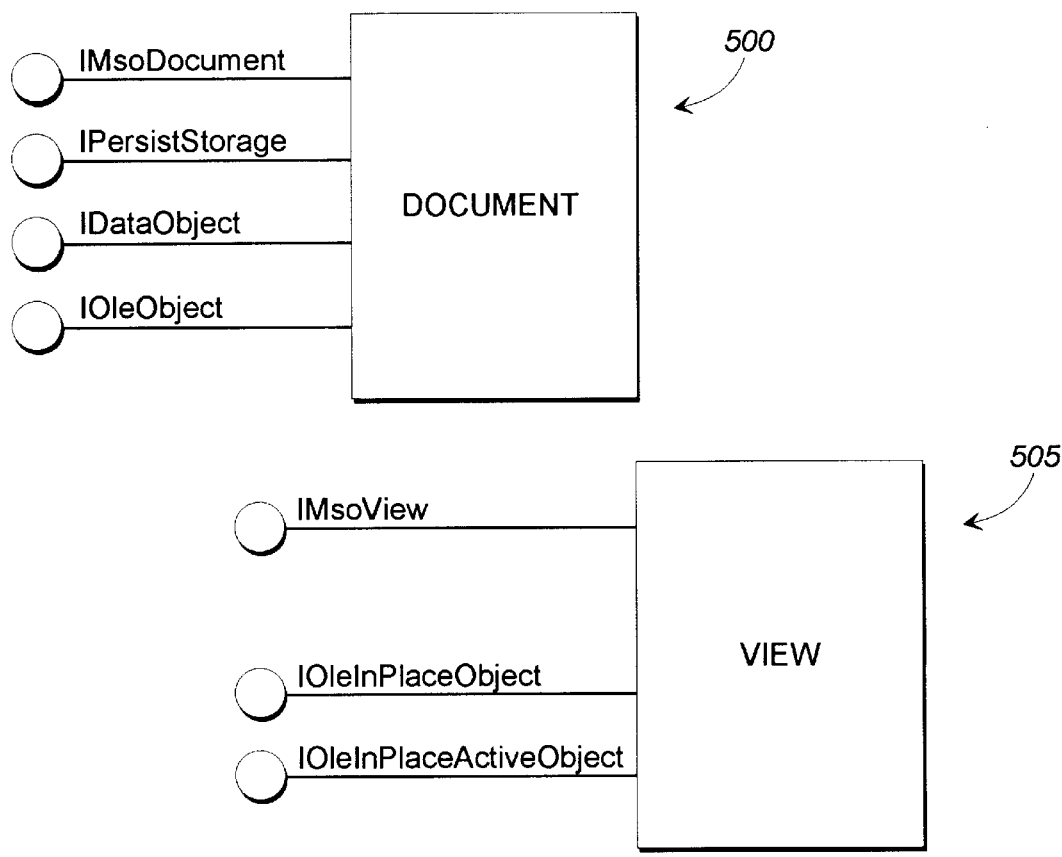
FIGS. 5a and 5b illustrate the components that are included on server and container sides of a Document Object (DocObject) interface in accordance with an embodiment of the present invention.

A number of logical components are involved in implementing the DocObject interface. These components follow the client/server model, wherein a client (or DocObject container) requests service from a DocObject server. FIG. 5a illustrates the components that are included on the server side of a DocObject interface. The server side includes a document 500 and a view 505. The document 500 and the view 505 may be included in a single object or may constitute separate objects. The lines and circles that extend from the document 500 and view 505 specify the interfaces that are supported by each logical component. In FIG. 5a, the IMsoDocument and IMsoView interfaces are part of the DocObject interface. The remaining interfaces are part of OLE 2.0.

Figure 5B:
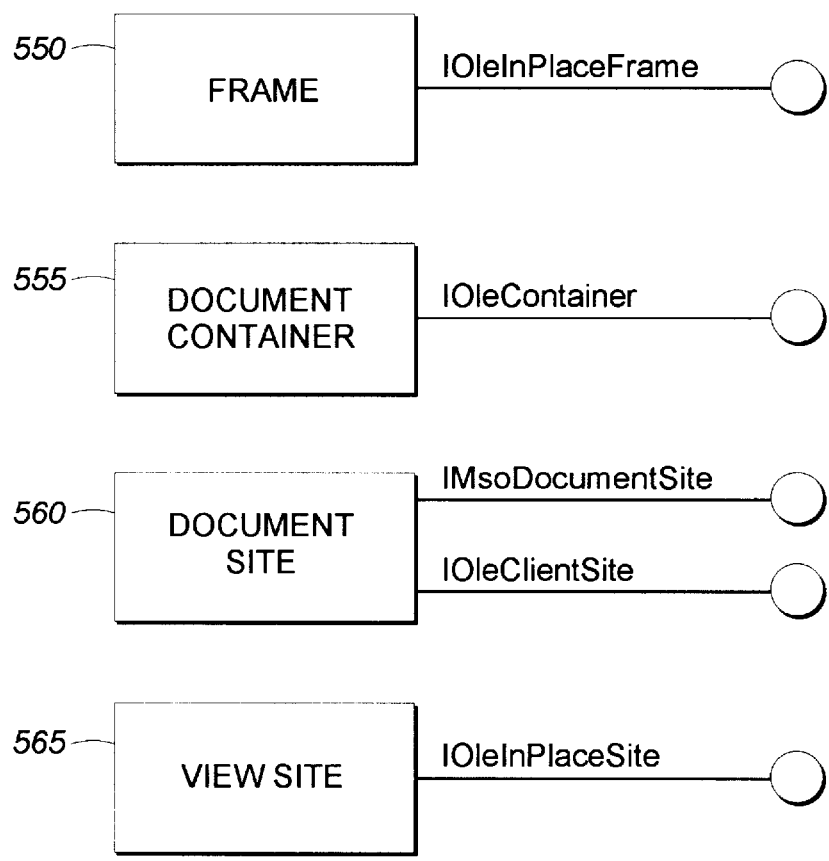

FIG. 5b illustrates the logical components that form the client side of the DocObject interface. The logical components include a frame 550, a document container 555, a document site 560, and a view site 565. The frame 550 provides the frame for the document object. The document container 555 is the container that stores the document object. The document site 560 serves as the site for the embedded document object. The view site 565 provides a site on the client for the view 505 (FIG. 5a). The view in the view site 565 supports interfaces that enable a view 505 to communicate with the document container 555. The interfaces supported by the client side components are illustrated in FIG. 5b. The IMsoDocumentSite interface is part of the DocObject interface. The remaining interfaces are part of OLE 2.0.

Referring still to FIGS. 5a and 5b, the interfaces will be briefly described. The document 500 supports at least three standard OLE interfaces, including IPersistStorage, IDataobject, and IOleObject. The IPersistStorage interface is the interface through which the document container 555 communicates with the document 500 regarding storage. The IDataobject interface allows data to be passed to and from the document 500. The IOleObject interface is the primary interface though which an embedded object provides functionality to its container.

The IMsoDocument interface, which is also supported by the document 500, is specific to the DocObject interface. An object cannot act as a document object unless it support this interface. The IMsoDocument interface includes three functions. The CreateView () function is called to create a new view or to load a previously saved view. The GetDocMiscStatus () function is used to retrieve miscellaneous information about a document object. The EnumView () function enumerates the views that are provided for the document object.

The view 505 supports the OLE's standard IOleInPlaceObject and IOleInPlaceActiveObject interfaces. The IOleInPlaceObject interface is used primarily to allow a container to communicate with its contained object, and includes functions for deactivating the object and its associated user interface. The IOleInPlaceActiveObject interface provides an interface for the top level container to communicate with currently active objects.

The view 505 also supports the IMsoView interface, which is specific to the DocObject interface. The IMsoView interface includes the functions that facilitate the behavior of the view, which is logically partitioned from the frame in which it is displayed. The IMsoView interface includes 13 functions. The Set InPlaceSite () function establishes the in-place site that encapsulates the view port and the frame context of the view port. The GetInPlaceSite () function returns the current in-place site for the view. The GetDocument () function returns the document that is associated with the view. The SetRect () function sets the rectangular coordinates of the view point in the client coordinates of the view window. The GetRect () function returns the rectangular coordinates of the view port in the client coordinates of the view window. The SetRectComplex () function sets the rectangular coordinates of the view port scroll bars and size box. The Show () function is called to show or hide the view. The UIActivate() function is called to UI activate or deactivate the view. The Open () function asks a view to display itself in a native window. The Close () function is called to close a view and release its site pointer. The SaveViewState () function saves the current view state into a stream that is passes by the client to the view. The ApplyViewState () function applies a previously saved view state to a view. The Clone () function creates a new view having a same view context as the view that provides the function but has a different view port.

Referring still to FIGS. 5a and 5b, the interfaces implemented by the client side components will now be described. The frame 550 supports the standard OLE IOleInPlaceFrame interface. Its functions allow the insertion, removal, and manipulation of menus for the frame. The interface also includes functions for displaying text on a status line or for enabling or disabling modeless dialogs.

The document container 555 supports the standard OLE IOleContainer interface. This interface provides the ability to enumerate objects in a container and to keep a container running in the absence of other reasons for it to continue running.

The document site 560 supports the DocObject specific IMsoDocumentSite interface, which includes only one function. The ActivateMe () function is used to activate the document object 50. The function calls the CreateView () function in the IMsoDocument interface for all views the document wants to show.

The document site 560 also supports the standard OLE IOleClientSite interface. This is the primary interface by which an object requests services from its container.

The view site 565 supports the standard OLE IOleInPlaceSite interface. This interface includes a number of functions that allow an in-place active object to communicate with its immediate container. The view 505 communicates with the view site 565 via functions in the IOleInPlaceSite interface.

Figure 6:
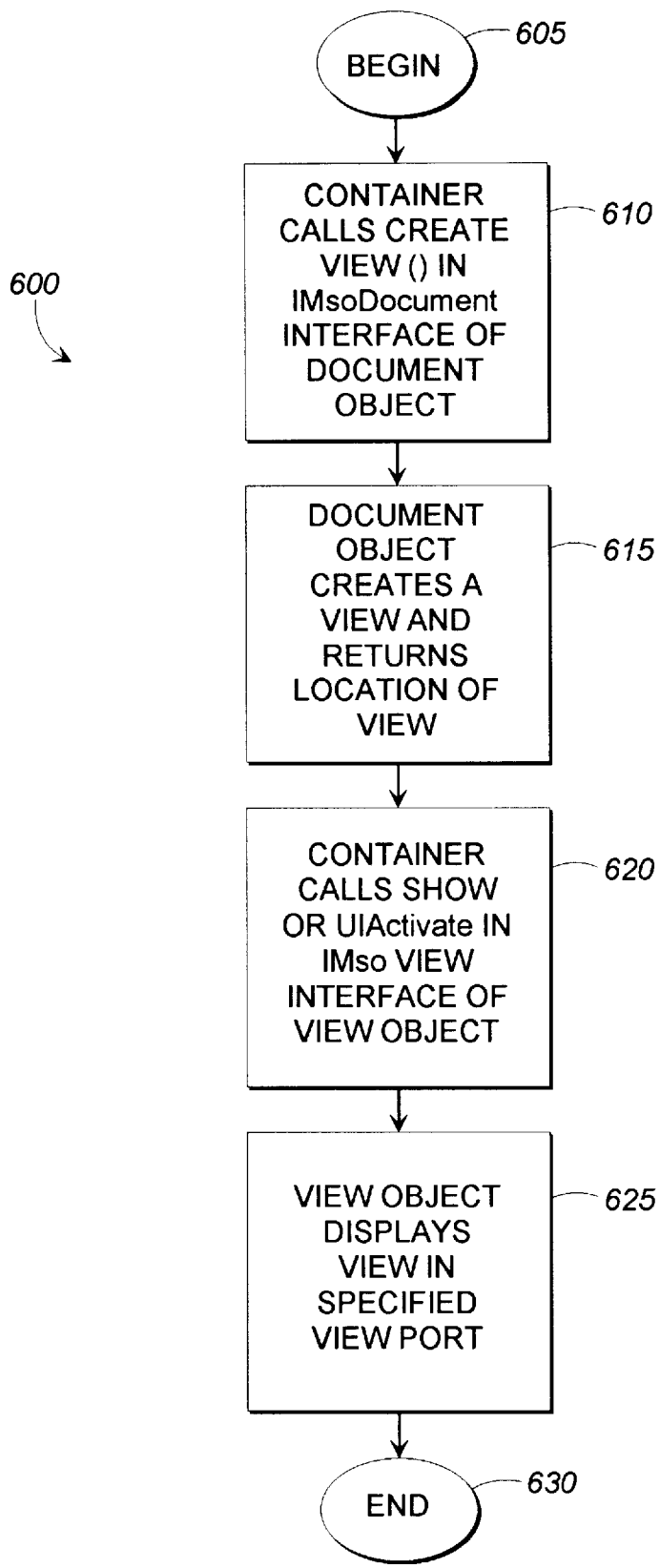
FIG. 6 is a flow diagram illustrating a method for invoking a DocObject server in accordance with an embodiment of the present invention.

FIG. 6 is a flow chart illustrating an exemplary method 600 that is carried out in order to display a document view of a document object in a view port provided by a foreign frame. The method 600 will be described in conjunction with components illustrated in FIGS. 5a and 5b. The method 600 begins at step 605 and proceeds to step 610. At step 610, the document container 555, which contains the document object 500, calls the CreateView () function in the IMsoDocument interface instance that is provided by the document object 500.

At step 610 the document object 500 creates the view or loads the view in accordance with the parameters of the CreateView () function call and returns a pointer to a memory location for the view 505.

At step 620 the document container 555 calls the Show or UIActive() functions in the instance of the IMsoView interface that is provided by the view object 505. At step 625 the view object 505 displays the view in the view port that is specified by the parameters that are passed to the view object. The method 600 terminates at step 630.

From the foregoing brief description, it should be appreciated OLE and DocObject, like other APIs, are quite complex and provide a wide variety of services that allow program modules to easily interface with each other. For more comprehensive information regarding OLE and DocObject, the reader may refer to any of a variety of publications, including the "OLE 2 Programmer's Reference," published by Microsoft Press, and the "OLE Document Object Specification," published by Microsoft Corporation.

The MAPI Messaging Architecture

In an exemplary embodiment of the present invention, the DocObject container is provided in the form of a mail note that is used to send and receive email message. A significant portion of the mail note's activity involves interacting with an email client application program, such as "MICROSOFT EXCHANGE." In an exemplary embodiment, the operating system supports, and the email client complies with, the Messaging Application Programming Interface (MAPI). The MAPI architecture is designed to make it easy for programmers to write messaging-enabled applications that are independent of the underlying messaging system. MAPI provides high-level functions that can be used to implement sophisticated messaging features with a relatively small amount of code. The code deals only with functions for sending, receiving, and addressing messages. The underlying messaging system is completely transparent. MAPI also provides other message-related functionality, such as access to address books.

Figure 7:
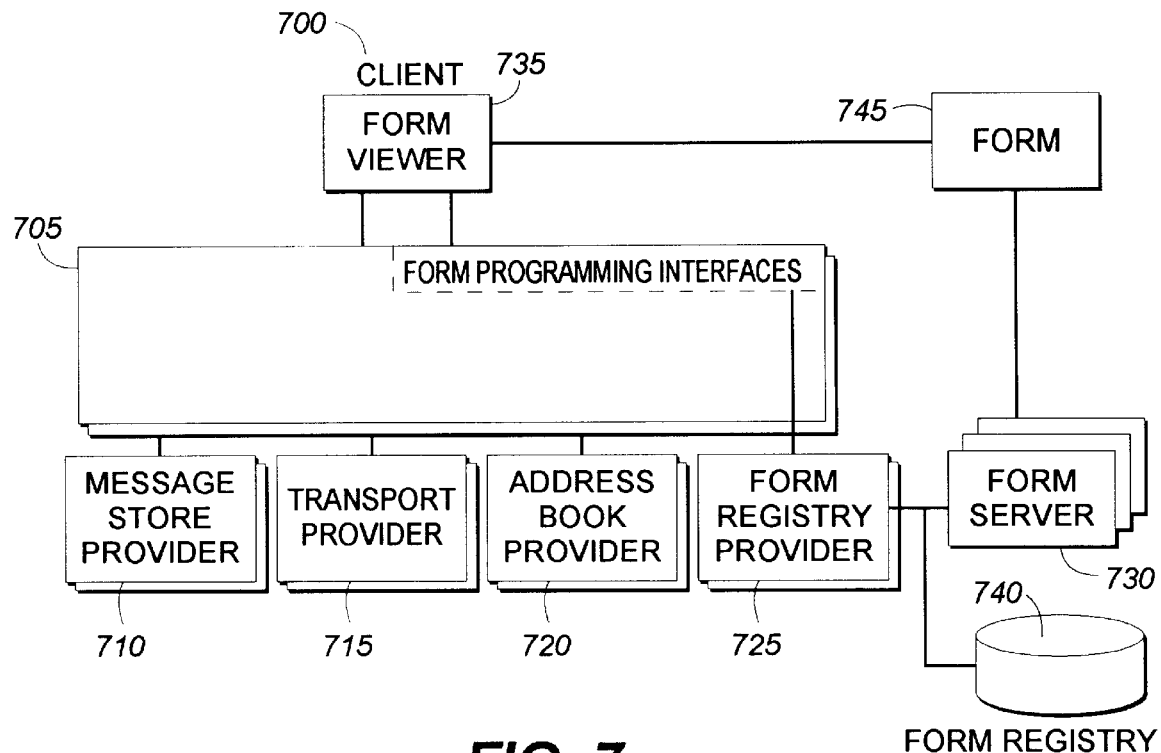
FIG. 7 is a diagram of portions of the MAPI messaging architecture.

FIG. 7 illustrates portions of the modular architecture defined by MAPI. A client application 700 is an application program that take advantage of the MAPI subsystem 705. The MAPI subsystem 705 is made up of a MAPI spooler, a common user interface, and programming interfaces. The MAPI spooler is a separate interface that is responsible for sending messages to and receiving messages from a messaging system. The common user interface is a set of dialog boxes that gives client applications a consistent look and users a consistent way to perform tasks.

The programming interfaces are used by the MAPI subsystem 705, by a client application 700, and by service provider writers. The main programming interface is an object-based interface known as the MAPI programming interface, which is based on the OLE Component Object Model.

The MAPI spooler is a separate process within the MAPI subsystem 705 and is responsible for sending messages to and receiving message from a messaging system. The spooler runs as a background process and also performs several functions related to messaging distribution. These include informing a client application when a new message has been delivered, invoking message preprocessing and post processing, generating reports that indicate that message delivery has occurred, and maintaining status on processed recipients.

MAPI service providers are located between MAPI subsystem 705 and the messaging system (not shown). Service providers are drivers that connect MAPI client applications 700 to an underlying messaging system. Most messaging systems include three types of service providers: message store providers 710, address book or directory providers 715, and message transport providers 720. The service providers work with MAPI to create and send messages in the following way. Messages are created using a form 745 that is appropriate for the specific type, or class, of message. The completed message is addressed to one or more recipients. When the client sends the message, the message store provider 710 checks that each recipient has a unique and valid address and that the message has all of the information necessary for transmission. If there is a question about a recipient, such as can occur when there are multiple recipients with the same name, an address book provider resolves the ambiguity. The message in then placed in the outbound queue.

Address book providers 720 handle access to directory information. Depending on the type of recipient and the address book provider, there is a wide range of information that can be made available. For example, all address book providers 720 typically store a recipient's name, address, and address type and organize the data using one or more containers. MAPI integrates all the information supplied by the installed address book providers into a single address book, thereby presenting a unified view to the client application.

Message store providers 710 handle the storage and retrieval of messages and other information for the users of client application. The message information is organized using a hierarchical system known as a message store, which is implemented in multiple levels, with containers called folders holding messages of different types.

Transport providers 715 handle message transmission and reception. They control the interaction between the MAPI spooler and the underlying messaging system . They also implement security if necessary and take care of any pre-processing and post-processing tasks that are required. Client applications 700 communicate with the transport providers 715 through a message store provider 710. When an incoming message is detected, the transport provider 715 informs the MAPI spooler and the message is delivered to the appropriate message store. To handle outgoing messages, the message store moves the message to the outbound queue, informs the MAPI spooler, and the spooler transfers it to the appropriate transport providers.

Client application users can access a summary view of the messages contained within each folder or view the messages individually using a form 745. Whether the client displays a standard form supplied by MAPI or a custom form supplied by a form developer depends on the type, or class, of the message. Messages are the units of data transferred from one user to another. Every message contains some text, which is formatted simply or more intricately depending on the form that is used, and envelope information that is used for transmission.

In the MAPI environment, a form or note is a viewer for a message. Each message has a message class that determines the particular form or note that is used as its viewer. MAPI defines a few messages classes and has implemented the forms for viewing these messages. Client application developers can create new message classes and custom forms for viewing messages with the new classes.

Every custom form implements a set of standard menu commands (e.g., open, create, delete, reply, and forward) and a set of commands that are specific to that particular form. The MAPI form architecture involves three main components: a form registry provider 725, a form server 730, and a form viewer 735.

The form registry provider 725 maintains a library of information about all of the forms available on the computer and enables the client to select a form that is suitable for the message being displayed. Form data is stored in a form registry 740, which is stored in one of the computer's memory storage devices. The form server 730 is responsible for displaying the form and providing the information for the display. The form server manages the user's interaction with the form by interpreting the menu selections and processing the messages. The form viewer 735 is a component within a client application that contains the display and presents it to the user.

From the foregoing, it will be appreciated that MAPI provides a wide variety of features and functions in addition to those included in the brief description presented above. For additional information regarding MAPI, the reader may refer to the MAPI documentation, entitled Messaging Application Programming Interface (MAPI) version 1.0, which is published by Microsoft Corporation, and which is incorporated herein by reference.

An Exemplary System For Editing An Email Message

As mentioned above, the preferred embodiment of the present invention is utilized in conjunction with the "MICROSOFT EXCHANGE" email client and the "MICROSOFT WORD" word processing program, which forms a part of the "MICROSOFT OFFICE" suite of program modules. The "MICROSOFT WORD" word processor and the "MICROSOFT EXCHANGE" email client are designed to operate in conjunction with Microsoft Corporation's "WINDOWS 95" or "WINDOWS NT" operating systems.

The present invention, is directed to an improved system and method for in-place editing and viewing of an electronic mail message using a separate program. Generally described, an embodiment of the present invention employs a DocObject-enabled mail note or form to provide a DocObject container with an email-related user interface (UI) and a view port or frame for viewing and editing the contents of an email message. Instead of implementing text editing or word processing functionality in the mail note itself, the mail note allows a separate, full-featured word processing program to display and edit the message in the view port provided by the mail note. This allows the user to edit and view email messages using the editing environment and formatting capabilities of the full-featured word processing program.

Figure 8A:
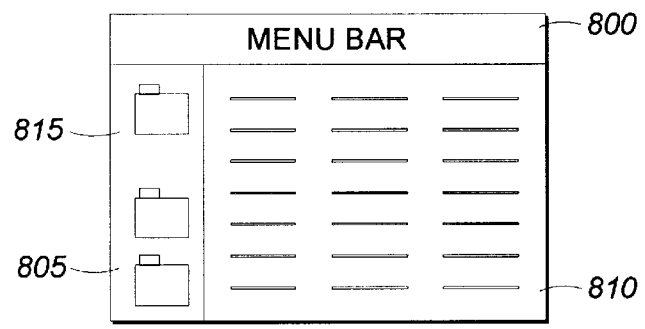
FIGS. 8a and 8b illustrate the features of the user interface provided by an email client in accordance with an embodiment of the present invention.
Figure 8B:
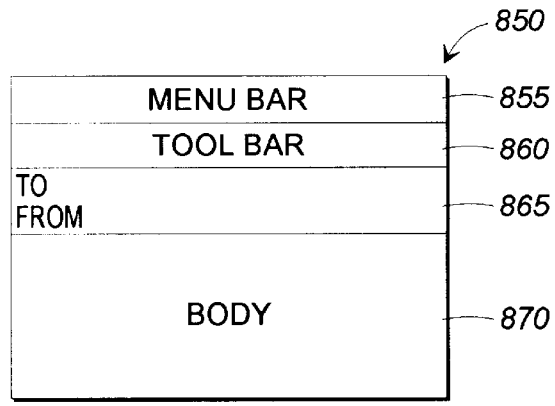

To understand the advantages and operation of present invention, it is helpful to discuss how email messages are viewed in conjunction with an email client such as "MICROSOFT EXCHANGE." FIGS. 8*a* and 8*b* illustrate the features of the user interface provided by an email client and associated mail note. FIG. 8a illustrates a user interface for a list view, which includes three regions. The first region 800 includes a menu bar and toolbar for displaying commands associated with the email client. The second region 805 displays folder icons, which are associated with groups of messages in the MAPI message store. Folder icons represent folders, which contain message items. A folder can be selected to obtain a view of a list of the message items in the folder. A third region 810 displays a list of the message items included in a selected folder 815.

When the user selects and opens one of the messages in the third region 810, the email client displays the message in the context of a form, or mail note 850, which is illustrated in FIG. 8b. The mail note 850 provides the framework for viewing the MAPI message data associated with the selected message. The mail note 850 includes four regions. A first region 855 provides a menu bar. A second region 860 provides a toolbar. A third region 865 provides message addressing information. A fourth region 870 displays the body of the message. The email client will also cause a mail note 850 to be displayed when the user creates a new message or views a previously stored message.

Figure 9:
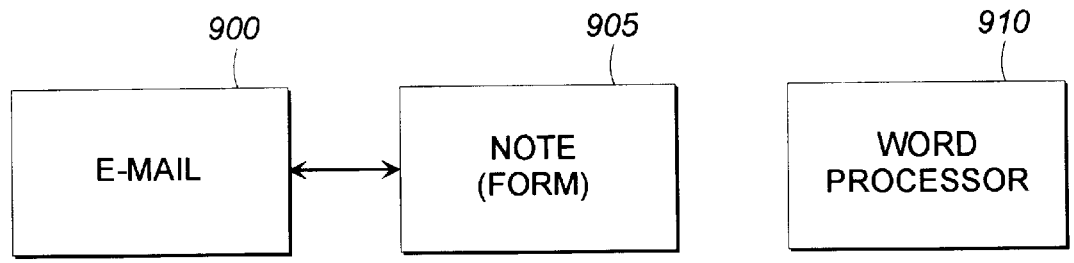
FIG. 9 is a diagram illustrating the interaction between an email client and a word processing program.

FIG. 9 illustrates the interaction between prior art email clients and word processing programs. In FIG. 9, the email client 900 employs a mail note 905 to display the contents of a message in the MAPI message store (not shown). The email client employs send and read mail notes, which are used to edit and display unsent messages and sent messages, respectively. Those skilled in the art will appreciate that send mail notes include editable fields and are optimized to display new messages. Similarly, read mail notes are optimized to display sent or existing messages. The email client includes default, or standard, mail notes that may be used to view and edit messages. The user may install other mail notes or forms, including custom forms.

In the system of FIG. 9, the mail note 905 is responsible for formatting and displaying the text of the message. In the case of some email clients, the formatting is limited to plain text. Other email clients and mail notes provide some level of rich text formatting (RTF), which allows the user to use a variety of formatting features. Regardless of the type of mail note used in the prior art, the user's full powered word processor 910 is not directly involved in the process of edit and viewing email messages. Although the word processor 910 could be used to create formatted documents that were attached to the email message, or to compose a message that was then pasted into the email message (subject to the formatting capabilities of the mail note), the user could not use the full powered word processor 910 to edit and send an email message in the context of the mail note. An example of a full powered word processor 910 is the "MICROSOFT WORD" application program.

Figure 10:
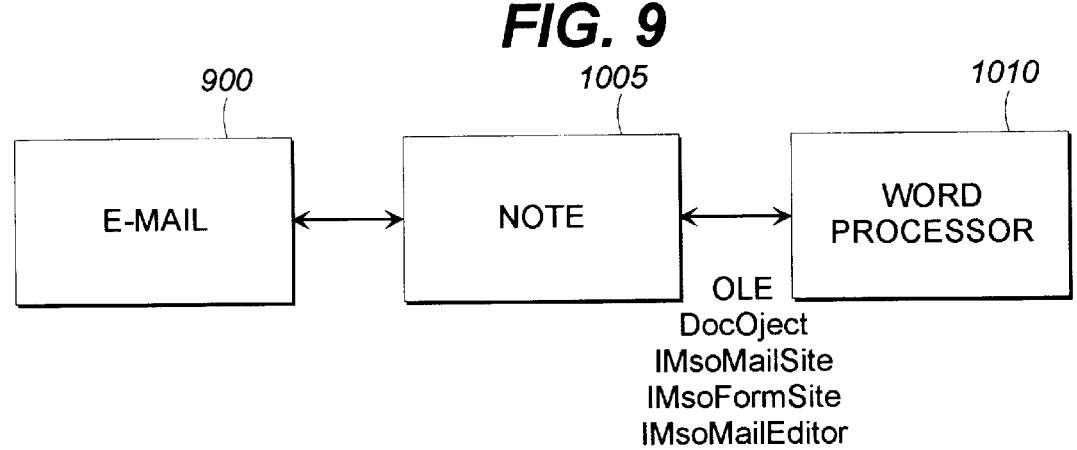
FIG. 10 is a diagram illustrating the interaction between an email client, a DocObject-enabled mail note, and a DocObject server in accordance with an embodiment of the present invention.

FIG. 10 illustrates an exemplary embodiment of the present invention. In this embodiment, the email client's default send and read mail notes have been replaced with DocObject-enabled send and read mail notes 1005. The DocObject-enabled mail note is a DocObject container that provides a view port or frame that allows the DocObject-enabled word processor 1010 (or DocObject server) to display and edit an email message in the view port provided by the mail note 1005. In other words, the mail note 1005 and word processor 1010 utilize the OLE and DocObject interfaces to allow the word processor 1010 to display a document object in a view port provided by the mail note 1005. In addition to the OLE and DocObject interfaces, the preferred embodiment of the present invention defines three new interfaces, including IMsoMailSite, IMsoFormSite, and IMsoMailEditor, which are described below. In order to distinguish a DocObject-enabled mail note 1005 from the standard email client mail note 905, the DocObject-enabled mail note will be referred to as a "container mail note." Although the send and receive container mail notes replace the email clients standard mail notes, none of the other installed forms are affected. An example of a suitable DocObject-enabled word processor 1010 is version 7.0 of the "MICROSOFT WORD" application program.

The container mail note continues to provide the user with email-related commands and functionality. The container mail note provides the MAPI functionality associated with handling the disposition of messages (e.g., send, reply, forward, etc.) and the exchange of data between the MAPI message store and the container mail note. The word processor, which is the DocObject server, provides word processing commands and functionality and exchanges data with the container mail note. The email and word processing commands displayed to the user are merged via the OLE menu merging functions. This provides the user with immediate access to menus and toolbars associated with both the email client and the word processor.

Although using a full powered word processor in the context of a container mail note provides improved editing and formatting capabilities, those skilled in the art will understand that messages created in the word processor's native format must be compatible with a variety of email clients. The message format is defined by the email client. In an exemplary embodiment, the email client complies with the MAPI specification. The MAPI format ensures the interoperability between an embodiment of the present invention, a prior art rich text mail client, and other mail clients and gateways. This is particularly important with respect to an attachment. For example, a word processor may create a compound document in which the attached files are embedded in the document. This type of attachment handling is incompatible with MAPI, which requires that attachments be stored separately at the end of the message.

Figure 11:
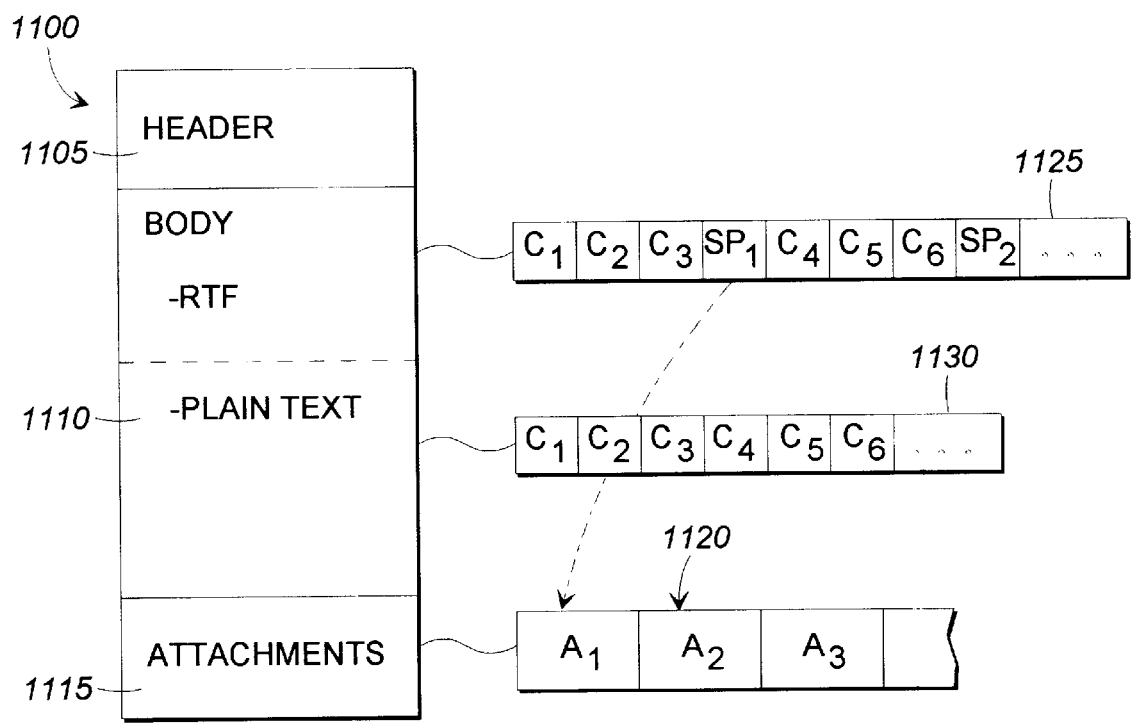
FIG. 11 is a diagram illustrating the MAPI format for storing email message data.

In order to comply with the MAPI format, messages are saved in three parts, which are illustrated in FIG. 11. The mail message 1100 includes a header portion 1105, a body portion 1110, and an attachments portion 1115. The header portion 1105 includes standard MAPI header information. The body portion 1110 includes both RTF and plain text versions of the text that forms the message body. The RTF version of the message includes data stream 1125, which includes ASCII characters ($c_1$, $c_2$, etc.) and special characters ($sp_1$, $sp_2$, etc.). The plain text version of the message includes data stream 1130, which includes only ASCII characters ($c_1$, $c_2$, etc.). The attachments portion 1115 contains all of the mail attachments and their character positions in the body of the text. Other objects, such as graphics, may be included in the message body. Objects of this type may be treated like attachments and inserted into the text data stream when a message is opened. In some cases, graphics objects may be part of the RTF data.

The RTF data is a gracefully degrading system of formatting that uses keywords. RTF is also a format that may be emitted by the preferred word processor 1010. Some elements of the preferred word processor's formatting are supported by RTF, while others are not. The manner in which RTF files are read allows the reading word processor or text editor to omit unknown formatting keys. This allows the message to be rendered to the best fidelity of the client application while unsupported keywords are harmlessly dropped.

Although the RTF text can be read by a variety of rich text readers, the message 1100 also includes a plain text copy of the message. The plain text stream allows downlevel clients to resolve and display the message text, although they are not able to resolve any of the RTF body. In addition, when saving the message, the word processor 1010 ensures that any special characters and formatting attributes are converted before being stored to the plain text portion of the message. For example, tables recognizable by the word processor may be stored as tab delimited text, and special characters such as "©" may be stored as the text "(c)." Those skilled in the art will appreciate that this approach to storing the message allows plain text clients to read the text of the message and RTF clients to read most of the rich text. The word processor-specific formatting that can not be read by standard RTF clients is displayed in a nicely converted alternative format. Thus, each recipient will be able to view the message with as much formatting as his or her mail client allows.

Those skilled in the art will appreciate that storing both RTF and plain text increases the size of the messages. However, the inventors believe that it is much more efficient to compose a nicely-formatted message in the context of the container mail note than it is to create and send the nicely formatted file as an attachment to an email message.

The message 1100 includes a plurality of attached files 1120, which form the attachments portion 1115 of the message. The attached files are separated from the body text in order to allow the messages to pass through a variety of email gateways without compromising the integrity of the attached files. In an embodiment of the present invention, the location of an attachment (e.g., $A_1$) in the message body is indicated in two ways. In the body of the message, the RTF data stream 1125 includes a special character (e.g., $sp_1$) that indicates the location for the attachment to be inserted. In the plain text data stream 1130, the location of the attachment is determined by indicating the position of the character after which the attachment belongs. Those skilled in the art will understand that counting the characters in the message is inefficient. However this method is chosen because of the absence of special characters in the plain text message. Similarly, the number of characters in the RTF data stream 1125 and plain text data stream 1130 may differ because of the conversions between special characters and plain text, as in the case where one special character, such as a ©, is converted to multiple characters, such as (c). In this example, one character in the RTF data stream 1125 corresponds to three characters in the plain text data stream 1130.

The OLE and DocObject interfaces described above allow the word processor 1010 to display text in a view port provided by the container mail note 1005. However, in order to allow the container mail note 1005 to transport data between the MAPI message store and the word processor 1010, it is necessary to define a protocol for transferring data between the container mail note and the word processor. This protocol must ensure that attachments are handled in a way that complies with MAPI.

In addition to the OLE and DocObject interfaces discussed earlier, the preferred embodiment of the present invention employs three additional interfaces in order to facilitate communication between the container mail note 1005 and the word processor 1010. The container mail note 1005, which is the DocObject container, implements the IMsoMailSite and IMsoFormSite interfaces. The word processor 1010, which is the DocObject server, implements the IMsoMailEditor interface. Each of these interfaces and their associated functions are described below.

The IMsoMailSite interface, which is implemented by the DocObject container, has the following members, parameters, and descriptions:

```
virtual HRESULT_stdcall CreateAttachment(
    /*[unique][in]*/LPSTRpszFile,
    /*[unique][out][in]*/MSOOBJECT_RPC_FAR*
        pobject)=0;
```

This member function is used by the word processor 1010 when the user inserts an attachment into the message. The word processor 1010 passes the container mail note 1005 the name of the attachment file and the container mail note returns an MSOOBJECT that can be embedded in the message at the current character position. An MSOOBJECT is an OLE object that is embeddable by the word processor's OLE container support.

```
virtual HRESULT_stdcall Clone Attachment(
    /*[unique][in]*/MSOOBJECT_RPC_FAR*pobjectSrc,
    /*[unique][out][in]*/MSOOBJECT_RPC_FAR*
        pobjectClone)=0;
```

This member function is used by the word processor 1010 to convert between an MSOOBJECT that is a mail attachment and an MSOOBJECT that is a Packager OLE object that contains the attached file. This is used when the user moves an MSOOBJECT from a container mail note 1005 to a non-mail document (such as a spreadsheet or a regular word processor document) or the reverse. MSOOBJECT's that are mail attachments can only exist in a container mail note.

```
virtual HRESULT_stdcall SetObjectList(
    /*[unique][out][in]*/MSOOBJECTLIST_RPC_FAR*
        pobjectlist)=0;
```

This member function is used by the word processor 1010 to pass the list of MSOOBJECTs in a message to the container mail note 1005 when the message is being saved. The RTF for the message does not contain any objects except when the location of the object cannot be expressed by the MSOOBJECTLIST semantics (such as when the object is in a word processor header).

The IMsoFormSite interface has the following members, parameters, and descriptions:

```
virtual HRESULT_stdcall GetTemplateName(
    /*[out]*/LPWSTR_RPC_FAR*ppwzTemplateName)=
        0;
```

This member function is used by the word processor 1010 to request the name of the word processor template that should be attached to the message if SetMessageData is called with the appropriate flags to indicate that a template is attached to the message. It should be noted that this function is more general than the other two and may be implemented without them. In that case, GetTemplateName would be used to request the name of the template that should be attached to a DocObject server document.

The IMsoMailEditor interface has the following members, parameters, and descriptions:

```
virtual HRESULT_stdcall SetMessageData(
    /*[in]*/DWORD setf,
    /*[in]*/CLIPFORMAT cfFormat,
    /*[in]*/IStream_RPC_FAR*pstm,
    /*[in]*/LPSTR pszAuthorName,
    /*[unique][in]*/MSOOBJECTLIST_RPC-
        FAR*pobjectlist)=0;
```

This member function is used by the container mail note 1005 to set and clear the contents of the message. The container mail note passes the word processor a group of flags, a format (cfText or cfRTF), an IStream, the author name (for revision marking), and a list of MSOOBJECTS with their corresponding character positions in the message. The group of flags tells the word processor whether to set or clear the message, whether its a New, Read or Compose message etc. The IStream contains the contents of the message in the specified cf (Windows clipboard) format.

```
virtual HRESULT_stdcall GetMessageData(
    /*[in]*/IStream_RPC_FAR*pstmRTF,
    /*[in]*/IStream_RPC_FAR*pstmText,
    /*[in]*/DWORD getf)=0;
```

This member function is used by the container mail note 1005 to get the contents of the message for saving or sending. The word processor writes an RTF rendering of the message to one IStream and a plain text rendering of the message to the other. If the group of flags request attachments, then the word processor uses the IMsoMailSite::SetObjectList function to pass a list of MSOOBJECTs.

```
virtual HRESULT_stdcall InsertObject(
    /*[in]*/MSOOBJECT_RPC_FAR*pobject)=0;
```

This member function is used by the container mail note to get the word processor to insert an MSOOBJECT into the message at the current character position.

```
virtual HRESULT_stdcall OnFocusChange(
    /*[in]*/BOOL fGotFocus)=0;
```

This member function is used by the container mail note 1005 to inform the word processor 1010 that the mail header edit control (To:, Cc:, Subject etc.) is either getting or losing the input focus. This is used by the word processor to enable/disable commands and make the word processor's cursor visible/invisible.

```
virtual HRESULT_stdcall IsDirty(void)=0
```

This member function is used by the container mail note 1005 to ask the word processor 1010 if the message is dirty (edited since last saved) or not.

```
virtual HRESULT_stdcall CloseObjects(
    DWORD dwReserved)=0;
```

This member function is used by the container mail note 1005 to get the word processor 1010 to close and save all objects that are open for editing/changes. This is called prior to GetMessageData being called so that all objects are current before the contents of the message are saved or closed.

Figure 12:
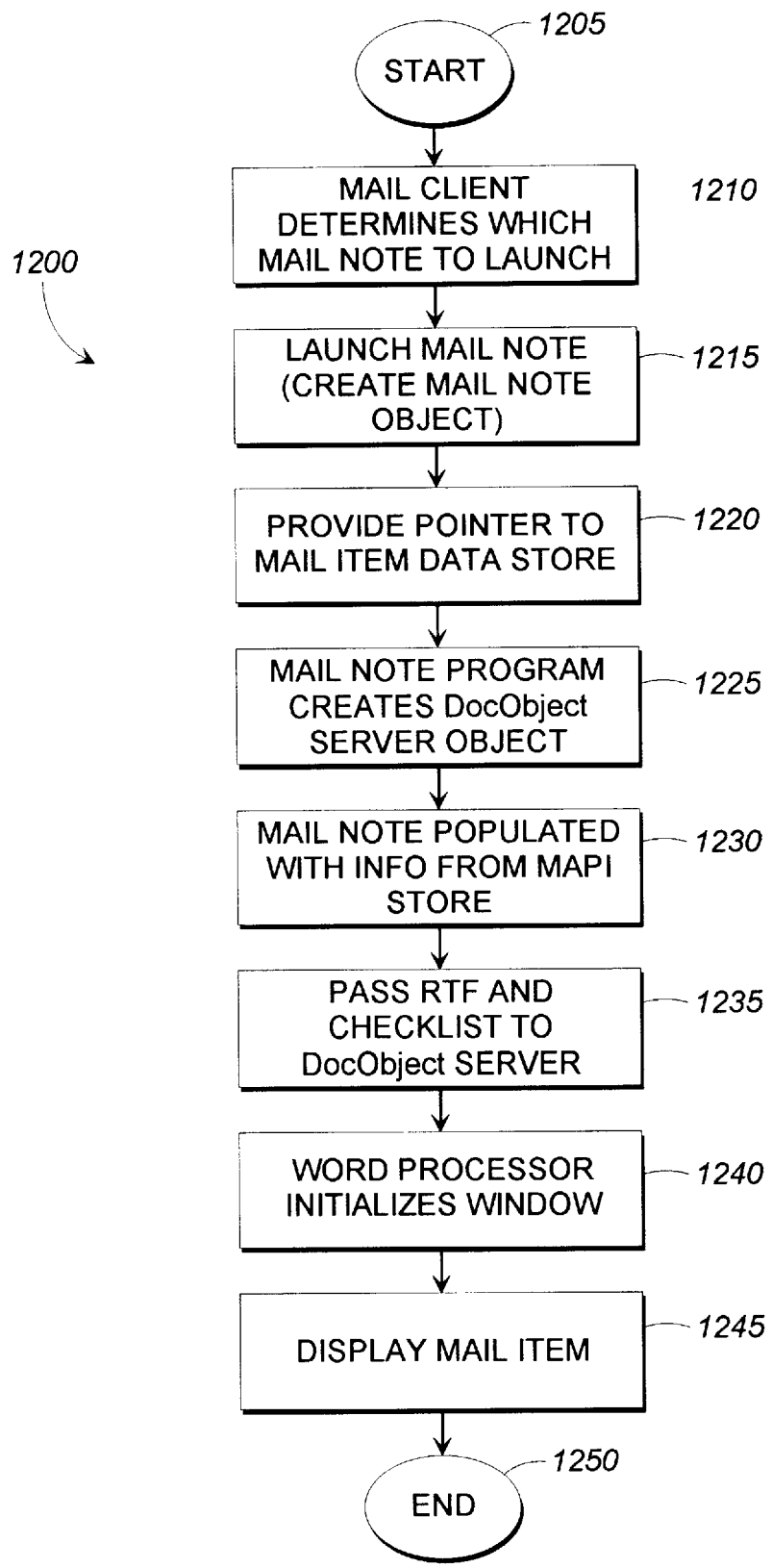
FIG. 12 is a flow diagram illustrating a method for reading a sent mail message in accordance with an embodiment of the present invention.
Figure 13:
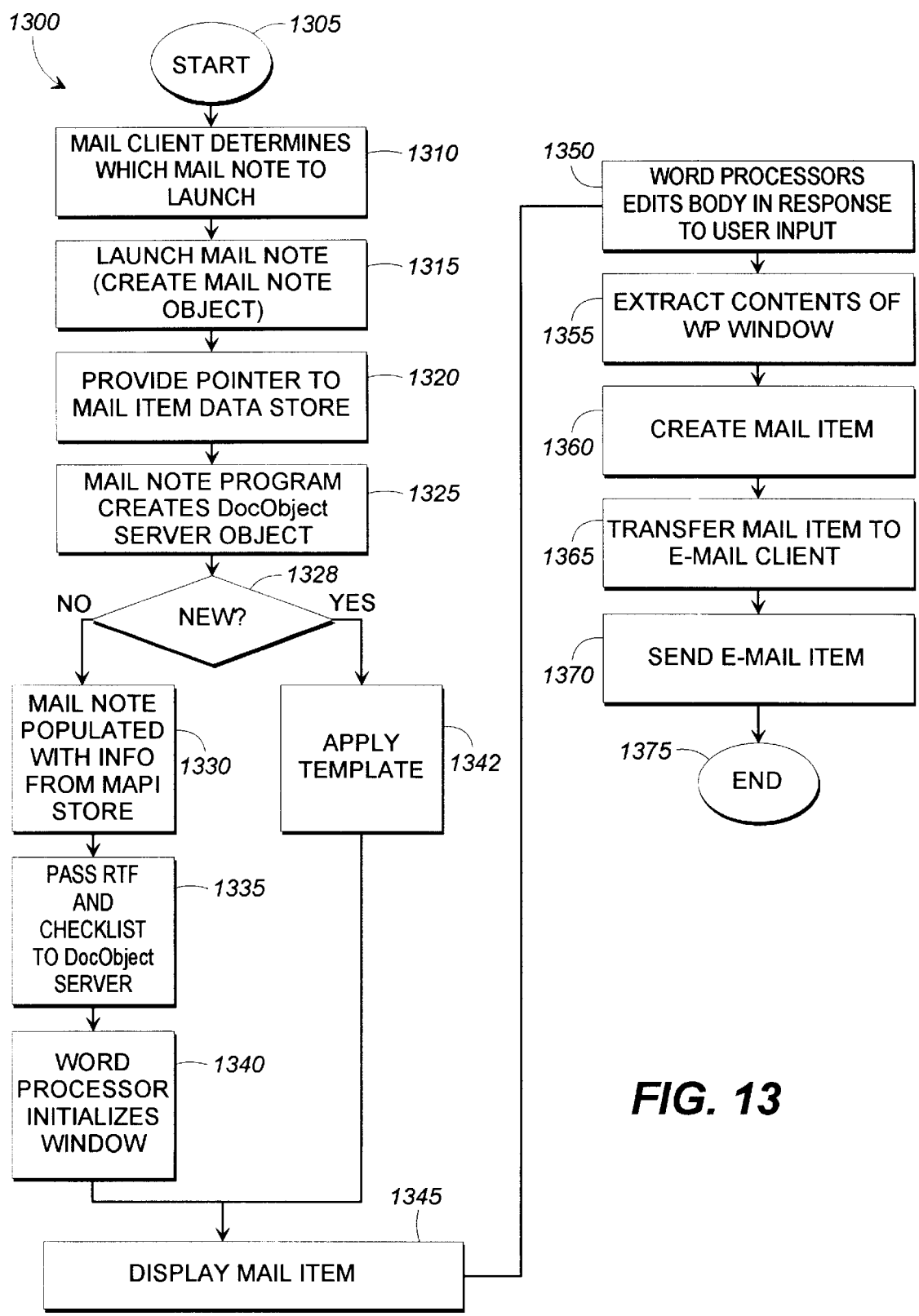
FIG. 13 is a flow diagram illustrating a method for editing and sending a new mail message in accordance with an embodiment of the present invention.

Turning now to FIGS. 12 and 13, exemplary methods for reading and editing mail messages will be described. FIG. 12 is a flow diagram of a method for reading a sent mail message. FIG. 13 is a flow diagram of a method for editing an unsent mail message.

Although FIGS. 12 and 13 are described in terms of tasks performed by the email client, the container mail note, and the word processor, those skilled in the art will appreciate that the present invention is a computer-implemented process that is carried out by the computer in response to input from the user and instructions provided by suitable program modules.

FIG. 12 illustrates a method 1200 for reading a sent email message. The method 1200 begins at step 1205 when the user selects a message to be read. At step 1210 the email client determines which mail note should be launched to view the selected message. Those skilled in the art will appreciate that the mail note corresponding to the selected message is determined by the class of the selected message. As mentioned earlier, the DocObject-enabled container mail note is installed in the place of the default mail notes provided with the email client.

At step 1215 the email client launches the proper mail note to read the selected message. For purposes of the present discussion, it is understood that the email client launches the DocObject-enabled read container mail note, which was registered in place of the default read mail note. At step 1220 the email client provides the container mail note with a pointer to the location in the MAPI message store where the selected message item is stored.

At step 1225 the container mail note creates a DocObject server object with the word processor as the document server. This is accomplished using the standard DocObject interfaces implemented by the container mail note and the word processor.

At step 1230 the container mail note retrieves data from the MAPI message store. This data includes the information typically found in the header of the container mail note, including the sender, recipients, and subject of the message.

At step 1235 the container mail note passes the RTF data and attachment data from the MAPI message store to the word processor. This is accomplished via the IMsoMailSite, IMsoFormSite, and IMsoMailEditor interfaces that were defined in order to translate MAPI data into a format that is compatible with the word processor. As mentioned above, special characters in the RTF data stream indicate where in the message the attachment objects should be inserted. At step 1240 the word processor composes the body of the message using the data provided by the container mail note.

At step 1245 the selected mail item is displayed on the monitor. The container mail note provides a DocObject container that includes a menu bar, toolbars, and header information. The view port provided by the DocObject container displays the body of the message under the control of the word processor. Those skilled in the art will appreciate that the displayed window includes both email and word processing commands and buttons as a result of OLE menu merging. This allows the user to perform email and word processing related functions without having to change contexts.

At that point, the method 1200 terminates at step 1250 and the message is displayed until the user closes the message.

FIG. 13 illustrates a method 1300 for viewing and editing an unsent message. After the message is completed, the message will be sent or saved. It will be apparent that the first several steps in the method 1300 are similar to those in the method 1200 described above.

The method 1300 begins at step 1305 when the user selects a "new message" command or indicates a desire to edit a previously stored, but unsent message. At step 1310 the email client determines which mail note should be launched to edit the new or unsent message. Those skilled in the art will appreciate that the mail note corresponding to the selected message is determined by the class of the selected message. As mentioned earlier, the DocObject-enabled container mail note is installed in the place of the default mail notes provided with the email client.

At step 1315 the email client launches the proper mail note to edit the new or previously stored message. For purposes of the present discussion, it is understood that the email client launches the DocObject-enabled container mail note, which was registered in place of the default mail note. At step 1320 the email client provides the container mail note with a pointer to the location in the MAPI message store if the container mail note is being used to view a previously stored message.

At step 1325 the container mail note creates a DocObject server object with the word processor as the document server. This is accomplished using the standard DocObject interfaces implemented by the container mail note and the word processor.

At step 1328 the container mail note determines whether the user has opened a previously stored, but unsent message, or created a new message. If the user has opened a previously stored message, the method follows the NO branch to step 1330.

At step 1330 the container mail note is populated with data from the MAPI message store. This data includes the information typically found in the header of the container mail note, including the sender, recipients, and subject of the message. At step 1335 the container mail note passes the RTF data and attachment data from the MAPI message store to the word processor. This is accomplished via the interfaces that were defined in order to translate MAPI data into a format that is compatible with the word processor. As mentioned above, special characters in the RTF data stream indicate where in the message the attachment objects should be inserted. At step 1340 the word processor composes the body of the message using the data provided by the container mail note.

If at step 1328 the user has opened a new mail message, the method follows the YES branch to step 1342. At step 1342 the container mail note indicates to the word processor whether it should apply a mail template to the new message. A mail template contains style definitions that control the look of the printed and electronic message headers. They can also contain boilerplate text and macros that help automate mail creation and processing. The mail template might also contain an electronic signature to be appended at the end of the mail message.

Mail templates are also useful for creating a variety of special purpose template that can be used to compose different types of mail messages. For example, a user could create templates for formal, friendly, and memo mail messages. Each of these templates would create mail with a different look. For example, friendly messages may contain bright graphics.

At step 1345 the selected mail item is displayed on the monitor. The container mail note provides a DocObject container that includes a menu bar, toolbars, and header information. The view port provided by the DocObject container displays the body of the message under the control of the word processor. If the message is a new message, the body of the message will be blank, unless is has been modified in accordance with a template.

At step 1350 the word processor edits the message body in response to user input. In response to the user invoking a "send message" command, the method 1300 proceeds to step 1355. Those skilled in the art will appreciate that the user may elect to save a message instead of send it. In either case, the data is extracted from the word processor in the same manner.

At step 1355 the container mail note extracts the message data from the word processor document object. This is accomplished using the IMsoMailSite, IMsoFormSite, and IMsoMailEditor interfaces described above. As the message data is extracted, it is provided in both RTF and plain text data streams. In the plain text data stream, some special characters and formatting is reformatted to ensure that it may be viewed on downlevel mail clients. Attachments are provided separately to the container mail note. In addition, attachments are removed from the body of the message and stored in the attachments portion of the MAPI message store.

At step 1360 the container mail note creates a mail message item in the format required by the email client. In an exemplary embodiment of the present invention, the message item complies with the MAPI format.

At step 1365 the container mail note transfers the message to the email client. This indicates to the email client that the message item has been stored in the proper format and provided a pointer to the message's location in the message store.

At step 1370 the email client sends the message item to the recipient via a connected network. After the message is sent by the email client, the message window is closed and the method terminates at step 1375.

Summary of the Detailed Description

From the foregoing description, it will be appreciated that the present invention provides an improved system and method for editing email messages using a full powered word processor. An exemplary embodiment of the present invention is embodied in a container mail note and word processing program that implement the OLE and DocObject interfaces to allow the word processor to display the email message in a view port provided by the container mail note. Additional interfaces are implemented to allow the container mail note to translate data between the word processor and an email client.

Those skilled in the art will appreciate that an embodiment of the present invention provides a variety of features and advantages not found in the prior art. For example, an embodiment of the present invention combines the functionality of two different kinds of applications: word processors and email clients. By including the user's full powered word processor in the DocObject-enabled mail note, the environment, context, and features sets used when editing email messages are identical to those available when creating word processing documents. As a result, although the user interface looks like the user is using the email client, the editing and reading of email is virtually the same as editing and reading word processor documents.

In the preferred word processor, a variety of useful features are available for editing and creating mail messages. For example, background AutoFormat can be used to make plain English text more legible and to convert textual representations of symbols into attractive symbols, such as converting (R) to ®.

Using the user's full powered word processor to edit email messages provides absolute consistency with existing word processor documents. This facilitates copying and pasting between email and the word processor because formatting, styles, and special word processor objects are kept in tact. In addition, the menus, toolbars and familiar keystrokes from the user's word processor are available when editing email messages. The user can also open exiting word processing documents in the email program, address them, and send them with no conversion or attachment.

The user can also use the word processor's macros to automate common email-related tasks, such as creating boilerplate replies or adding custom commands to an email message.

The text processing features of the user's word processor are also useful in the email environment. For example, an AutoCorrect feature will help keep common typos out of email messages. An AutoText feature will allow the user to insert commonly used text with only a few keystrokes. This is useful because it allows the user to append an email "signature" containing a custom salutation at the end of the email message.

An embodiment of the present invention also provides mail templates. The user can customize and choose between different mail templates in order to compose email in a variety of styles. For example, mail templates allow the user to customize the styles, fonts, colors, macros and look associated with any kind of email, just as can be done with a full powered word processor.

In addition, when using an embodiment of the present invention to edit or read messages, the user continues to have complete interoperability with the email inbox because the typical mail note commands continue to be available while using the container mail note with the word processor to edit the email message.

Furthermore, the messages created in this manner can be opened and read by any MAPI compatible email client. This is accomplished by ensuring that the container mail note converts the word processor's formatting conventions info a form that is consistent with MAPI. In addition to the handling of RTF text, this requires that embedded attachments are removed from the text of the message and separately stored in the message store.

The foregoing system may conveniently be implemented in a program module or program that is based upon the interfaces described herein and the flow charts in FIGS. 12 and 13. No particular programming language has been described for carrying out the various procedures described above because it is considered that the operations, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes.

Moreover, although the present invention has been described as including a full powered word processor in a container mail note, the interfaces and techniques described herein may be applied to incorporate other types of application programs in the container mail note. For example, the DocObject interfaces may be used to allow a spreadsheet program or desktop publishing program to display their respective documents in the view port provided by the container mail note. Furthermore, the present invention is not limited to the Document Object interface, but may be implemented using other architectures that allow in place editing and viewing of documents.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. A method for operating a container object to display a message item, the message item being stored in a message store, the container object being invoked by an email client application in response to an input, the method comprising the steps of:
    retrieving from the message store header data and body data, each associated with the message item;
    creating a server object associated with a program module, the program module being operative for rendering the body data;
    providing the body data to the program module; and
    displaying a mail note associated with the message item, the message item including a command region, a header region and a body region,
    the command region including commands associated with both the container object and the program module;
    the header region including at least a portion of the header data; and
    the body region including at least a portion of the body data as rendered by the program module.

2. The method recited in claim 1, further comprising the steps of:
    retrieving from the message store attachment data associated with the message item;
    providing the attachment data to the program module; and
    displaying the attachment data in the body region, the attachment data being displayed by the program module in association with the body data.

3. The method recited in claim 2, wherein the body data comprises a special character corresponding to the attachment data, and wherein the attachment data is displayed in the body region in a position determined by the location of the special character in the body data.

4. The method recited in claim 1, wherein the body data comprises formatting codes, and wherein the program module renders the body data in accordance with the formatting codes.

5. The method recited in claim 1, wherein the header data includes information regarding the source and destination of the message item.

6. The method recited in claim 1, wherein the commands associated with the container object include commands associated with the disposition of the message item.

7. The method recited in claim 1, wherein the commands associated with the program module include options associated with the rendering of the body data.

8. The method recited in claim 1, wherein the program module comprises a word processing program.

9. A computer system for employing a container object to display a message item, comprising:
    a processing unit;
    an input device connected to the processing unit; and
    a display device coupled to the processing unit for displaying the object;

the processing unit, responsive to instructions from a program module running on the computer system, being operative to:

invoke the container object in response to an input from the input device;

retrieve body data associated with the message item;

create a server object associated with a program module, the program module being operative for rendering the body data in the container object;

providing the body data to the program module; and displaying on the display a mail note including the body data, the body data being rendered by the program module.

10. The computer system recited in claim 9, wherein the processing unit is further operative to:

retrieve attachment data associated with the message item;

provide the attachment data to the program module; and display the attachment data in association with the body data, the displayed attachment data being rendered by the program module.

11. The computer system recited in claim 10, wherein the body data comprises text data and a special character corresponding to the attachment data, and wherein the attachment data is displayed in the body region in a position determined by the location of the special character in the body data.

12. The computer system recited in claim 9, wherein the program module comprises a word processing program and the body data comprises formatting codes, and wherein the program module renders the body data in accordance with the formatting codes.

13. A computer-readable medium on which is stored a computer program for operating a container object to display a message item, the computer program comprising instructions which, when executed by a computer, perform the steps of:

retrieving from a message store body data associated with the message item;

creating a server object associated with a program module, the program module being operative for rendering the body data;

providing the body data to the program module;

displaying a mail note including a command region and a body region, the command region including commands associated with both the container object and the program module, the body region including at least a portion of the body data as rendered by the program module;

retrieving from the message store attachment data associated with the message item;

providing the attachment data to the program module; and displaying the attachment data in the body region, the attachment data being displayed by the program module in association with the body data.

14. The computer-readable medium recited in claim 13, wherein the body data comprises text data and a special character corresponding to the attachment data, and wherein the attachment data is displayed in the body region in a position determined by the location of the special character in the body data.

15. The computer-readable medium recited in claim 13, wherein the body data comprises formatting codes, and wherein the program module renders the body data in accordance with the formatting codes.

16. The computer-readable medium recited in claim 13, wherein the commands associated with the container object include commands associated with the disposition of the message item, and wherein the commands associated with the program module include options associated with the rendering of the body data.

17. The computer-readable medium recited in claim 13, wherein the program module comprises a word processing program.

18. A method for operating a container object to edit a message item, the container object being invoked by an email client application in response to input, the method comprising the steps of:

creating a server object associated with a program module;

displaying a mail note associated with said message item, the mail note including a command region, a header region and a body region, the command region including commands associated with both the container object and the program module and the body region including body data rendered by the program module;

extracting the body data from the program module;

forming the message item, the message item including a header and a body, the body comprising the body data; and transmitting the message item to an intended recipient.

19. The method recited in claim 18, wherein the message item includes an attachment list, and further comprising the steps of:

displaying attachment data in the body region, the attachment data being displayed by the program module in association with the body data;

extracting the attachment data from the program module; and storing the attachment data in the attachment list.

20. The method recited in claim 19, wherein the body data comprises a special character corresponding to the position of the attachment data in the body data.

21. The method recited in claim 18, wherein the body data comprises formatting codes, and wherein the program module renders the body data in accordance with the formatting codes.

22. The method recited in claim 21, wherein extracting the body data comprises removing the formatting codes from the body data prior to storing the body data in the message item.

23. The method recited in claim 18, further comprising the step of providing template identification data to the program module, the template identification data corresponding to formatting attributes applied to the body data.

24. The method recited in claim 18, wherein the commands associated with the container object include commands associated with the disposition of the message item, and wherein the commands associated with the program module include options associated with the rendering of the body data.

25. The method recited in claim 18, wherein the program module comprises a word processing program.

26. A computer system for operating a container object to edit a message item, comprising:

a processing unit;

an input device connected to the processing unit; and a display device coupled to the processing unit for displaying the object;

the processing unit, responsive to instructions from a program module running on the computer system, being operative to:

create a container object in response to input from the input device;

create a server object associated with a program module, the server object being in communication with the container object;

display a mail note including a command region, a header region and a body region, the command region including commands associated with both the container object and the program module and the body region including body data rendered by the program module;

transfer the body data from the program module to the container object;

form the message item, the message item comprising the body data; and transmit the message item to an intended recipient.

27. The computer system recited in claim 26, wherein the message item includes an attachment list, and further comprising the steps of:

displaying attachment data in the body region, the attachment data being displayed by the program module in association with the body data;

receiving the attachment data from the program module; and storing the attachment data in the attachment list.

28. The computer system recited in claim 27, wherein the body data comprises a special character corresponding to the position of the attachment data.

29. The computer system recited in claim 26, wherein the body data comprises formatting codes, and wherein the program module renders the body data in accordance with the formatting codes.

30. The computer system recited in claim 29, wherein transferring the body data comprises removing the formatting codes from the body data prior to storing the body data in the message item.

31. The computer system recited in claim 26, wherein the processing unit is further operative to provide template identification data to the program module, the template identification data corresponding to formatting attributes applied to the body data.

32. The computer system recited in claim 26, wherein the commands associated with the container object include commands associated with the disposition of the message item, and wherein the commands associated with the program module include options associated with the rendering of the body data.

33. The computer system recited in claim 26, wherein the program module comprises a word processing program.

34. A computer-readable medium on which is stored a computer program for operating a container object to store a message item, the computer program comprising instructions which, when executed by a computer, perform the steps of:

creating a server object associated with a program module;

display a mail note including a command region and a body region, the command region including commands associated with both the container object and the program module, and the body region including body data, the body data being rendered by the program module;

extracting the body data from the program module;

forming a message item including the body data and an attachment list;

displaying attachment data in the body region, the attachment data being rendered by the program module in association with the body data;

extracting the attachment data from the program module;

storing the attachment data in an attachment list; and transmitting the message item to an intended recipient.

35. The computer-readable medium recited in claim 34, wherein the body data comprises a special character corresponding to the position of the attachment data in the body data.

36. The computer-readable medium recited in claim 34, wherein the body data comprises formatting codes, and wherein the program module renders the body data in accordance with the formatting codes.

37. The computer-readable medium recited in claim 34, wherein extracting the body data comprises removing the formatting codes from the body data prior to storing the body data in the message item.

38. The computer-readable medium recited in claim 34, wherein the program further performs the step of providing template data to the program module, the template data corresponding to formatting applied to the body data.

39. The computer-readable medium recited in claim 34, wherein the commands associated with the container object include commands associated with the disposition of the message item, and wherein the commands associated with the program module include options associated with the rendering of the body data.

40. The computer-readable medium recited in claim 34, wherein the program module comprises a word processing program.

* * * * *